United States Patent [19]

Tsuru et al.

[11] Patent Number: 4,909,624
[45] Date of Patent: Mar. 20, 1990

[54] ACTIVE DISTANCE MEASURING APPARATUS

[75] Inventors: Hiroyuki Tsuru, Tokyo; Yoshiaki Ohtsubo, Yokohama; Toru Kosaka, Zama; Tadashi Otani, Tokyo, all of Japan

[73] Assignee: Nikon Corporation, Tokyo, Japan

[21] Appl. No.: 305,437

[22] Filed: Feb. 2, 1989

[30] Foreign Application Priority Data

Feb. 8, 1988 [JP] Japan .................................. 63-28290

[51] Int. Cl.⁴ .............................................. G03B 3/00
[52] U.S. Cl. ........................................... 356/1; 354/403
[58] Field of Search .............................. 354/403; 356/1

[56] References Cited

U.S. PATENT DOCUMENTS

| | | | |
|---|---|---|---|
| 4,579,438 | 4/1986 | Sato et al. ........................... | 354/403 |
| 4,796,044 | 1/1989 | Amanuma et al. ................... | 354/403 |
| 4,829,171 | 5/1989 | Katsumura ............................... | 356/1 |
| 4,849,781 | 7/1989 | Nakazawa et al. .................. | 354/403 |

FOREIGN PATENT DOCUMENTS 58-42411  1/1983  Japan .

Primary Examiner—Deborah L. Kyle
Assistant Examiner—Richard W. Wendtland
Attorney, Agent, or Firm—Shapiro and Shapiro

[57] ABSTRACT

An active distance measuring apparatus is equipped with a light projector for projecting modulated light to an object, a photoreceptor for receiving the modulated light reflected from the object and generating an alternating signal corresponding to the distance to the object, and a signal processing circuit for generating distance data from the alternating signal. The signal processing circuit is constituted by high level detecting means for detecting the high level value of the alternating signal, low level detecting means for detecting the low level value of the alternating signal, and an operation means for calculating distance data from the difference of both level values.

9 Claims, 8 Drawing Sheets

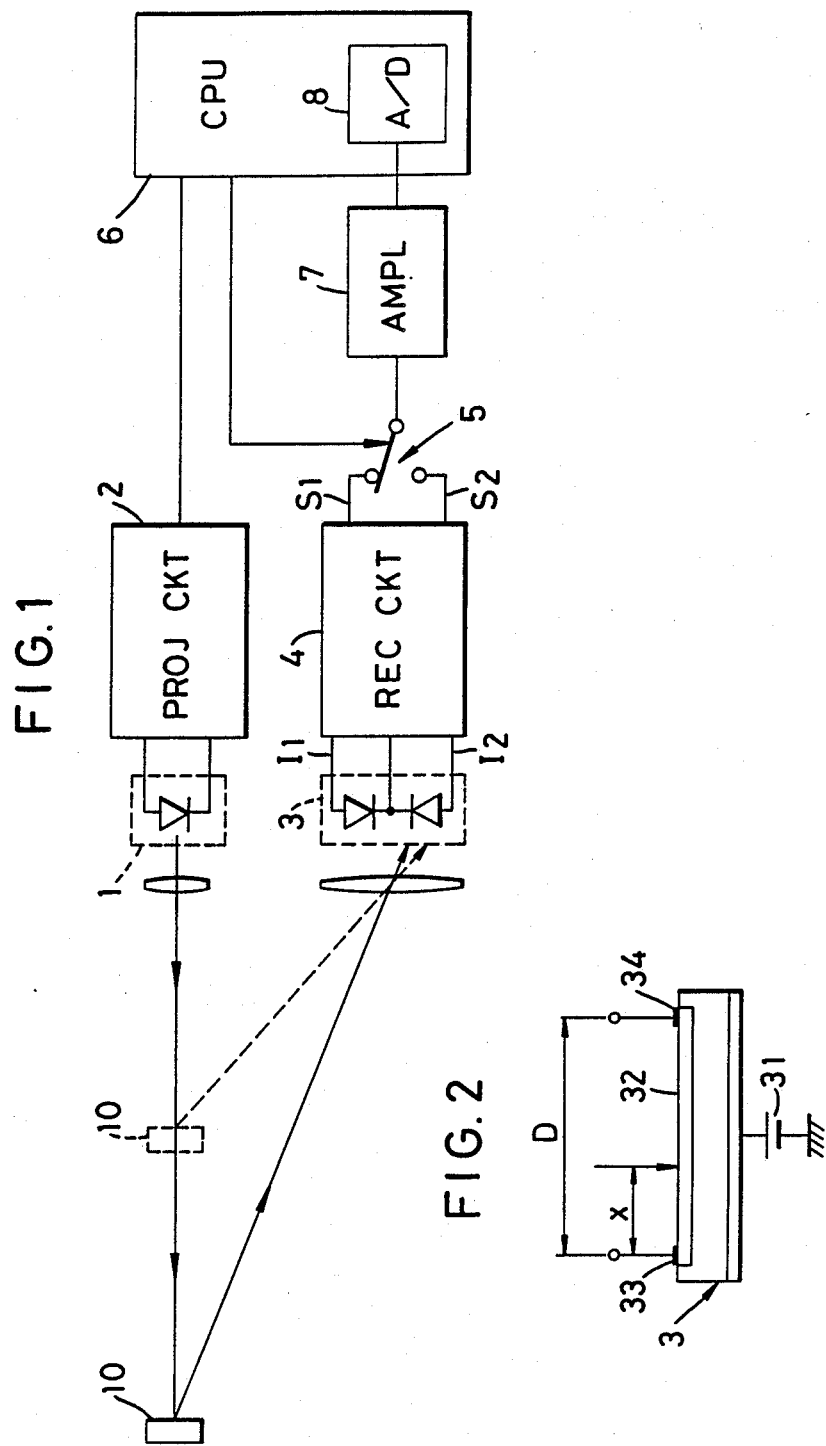

MAIN ROUTINE

SUBROUTINE

SUBROUTINE

SUBROUTINE

SUBROUTINE

SUBROUTINE

ACTIVE DISTANCE MEASURING APPARATUS

BACKGROUND OF THE INVENTION

1. Field of the Invention

The present invention relates to an active distance measuring apparatus for projecting modulated light to an object and measuring distance to said object from the light reflected therefrom.

2. Related Background Art

In the field of such apparatus, an active distance measuring apparatus for projecting pulse modulated infrared light to an object and receiving the reflected light from the object by a photosensor is disclosed for example in the Japanese Patent Publication 58-42411. For use as such photosensor there is known a position sensor device (PSD) providing photocurrents $I_1$, $I_2$ from a pair of output electrodes according to the incident position of the reflected light.

In such distance measuring apparatus, alternating photocurrents $I_1$, $I_2$ of a frequency equal to that of the pulse modulated light are converted into DC signals by a synchronized rectifying amplifier and subjected to addition and subtraction, and the added value $(I_1+I_2)$ and the subtracted value $(I_1-I_2)$ are amplified by DC amplifiers and are used for calculating distance data L according to the following equation:

$$L = \frac{I_1 - I_2}{I_1 + I_2} \cdot \alpha \tag{1}$$

wherein $\alpha$ is a constant.

Thus the distance data contain errors due to offsets and drifts in various amplifiers, for example the DC amplifier after rectification.

SUMMARY OF THE INVENTION

The object of the present invention is to provide an active distance measuring apparatus capable, in distance measurement with modulated light projection, of preventing the influence of offset and drift of the amplifiers, thereby obtaining exact distance data.

The present invention is applicable to an active distance measuring apparatus equipped with a light projector for projecting modulated light to an object, a photoreceptor for receiving the modulated light reflected form the object and generating an alternating signal corresponding to the distance to the object, and a signal processing circuit for generating distance data from said alternating signal.

In an aspect of the present invention, the abovementioned drawback is resolved by constituting the signal processing circuit by high level detecting means for detecting the high level value of the alternating signal, low level detecting means for detecting the low level value of said alternating signal, and an operation means for calculating distance data from the difference of both level values.

In another aspect of the present invention, the above-mentioned drawbacks is resolved by constituting the signal processing circuit by high level detecting means for detecting the high level value of the alternating signal, low level detecting means for detecting the low level value of said alternating signal, high level adding means for adding plural high level values, low level adding means for adding plural low level values, and operation means for calculating the distance data from the difference of the added values of both level values.

In still another aspect of the present invention, the above-mentioned drawback is resolved by constituting the signal processing circuit by level detecting means for detecting either of the high and low level of the alternating signal, and operation means for calculating the distance data from the difference between the value of the detected level and a reference value.

Also alternating signal contains the components of offset and drift of the amplifiers, but the use of difference between the high and low levels or of difference from a reference value, as in the present invention, allows to cancel the influence of the offset or drift, thereby enabling to obtain highly accurate distance data.

BRIEF DESCRIPTION OF THE DRAWINGS

FIG. 1 is a schematic block diagram of a distance measuring apparatus constituting a first embodiment.

FIG. 2 is a schematic view of a position detecting device;

DETAILED DESCRIPTION OF THE PREFERRED EMBODIMENTS

Figure 3:
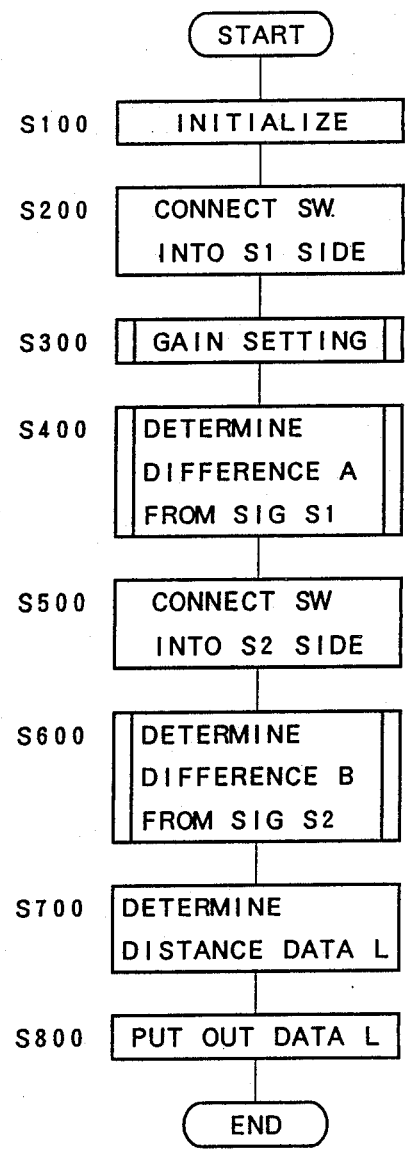
FIG. 3 is a flow chart showing a main routine for calculating distance data.

Now the present invention will be clarified in detail by embodiments hereof shown in the attached drawings.

In FIG. 1, a light projector IRED 1 comprising a light source such as a light-emitting diode projects, toward an object 10, infrared light which is pulse modulated by a light projecting circuit 2 containing a pulse modulation circuit. A semiconductor position detector (PSD) 3 receives the modulated infrared light reflected by the object 10. Said reflected light is focused on the surface of said position detector 3, to generate photocurrents $I_1$, $I_2$ corresponding to the position of the focused image.

Said position detector (PSD) 3 generates, upon receiving light on a light-receiving face 32 in a state biased by a bias power source 31, a photocurrent I corresponding to the amount of incident light, providing signal currents $I_1$, $I_2$ ($I_1+I_2=1$) represented by following equations, from paired electrodes 33, 34:

$$I_1 = I\frac{D-X}{D}$$

$$I_2 = I\frac{X}{D}$$

wherein D is the distance between the electrodes 33 and 34 of the PSD 3 as shown in FIG. 2, and X is the distance from the electrode 33 to the light receiving point. It is thus possible to know, from the signal currents $I_1$, $I_2$, the distance X or the position of the light receiving point, and the distance to the object 10 corresponding to said distance . Said photocurrents $I_1$, $I_2$ are alternating signals of a frequency equal to that of the modulated light.

A light receiving circuit 4 converts said photocurrents $I_1$, $I_2$ into voltage signals $S_1$, $S_2$ respectively. A selector switch 5 is controlled by instructions from a CPU 6 to selectively transmit the paired signals $S_1$, $S_2$ to an amplifier 7, which amplifies the signals $S_1$, $S_2$ transmitted through the switch 5 and of which gain is variably controlled by the CPU 6 according to the difference between the high level value and the low level value of the signals $S_1$, $S_2$. The CPU 6 controls various units according to the control sequence to be explained later and obtains the distance data. Said CPU 6 incorporates an A/D converter circuit 8.

In the following there will be explained the sequence for determining the distance data, with reference to FIGS. 3 to 5.

Figure 4A:
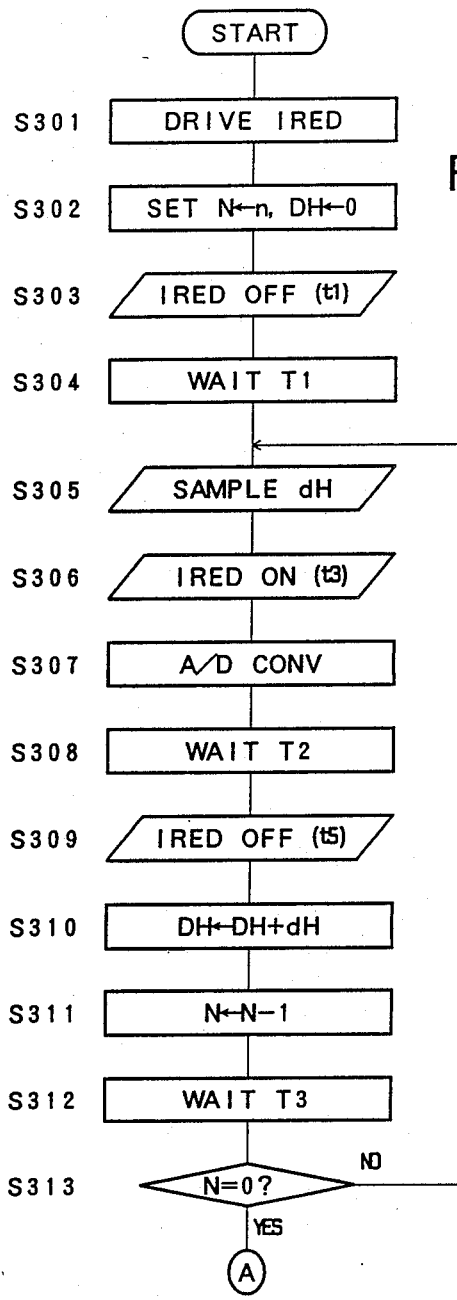
FIGS. 4A, 4B, 4C and 4D are flow charts showing subroutines for determining the level difference of received alternating signal.
Figure 4B:
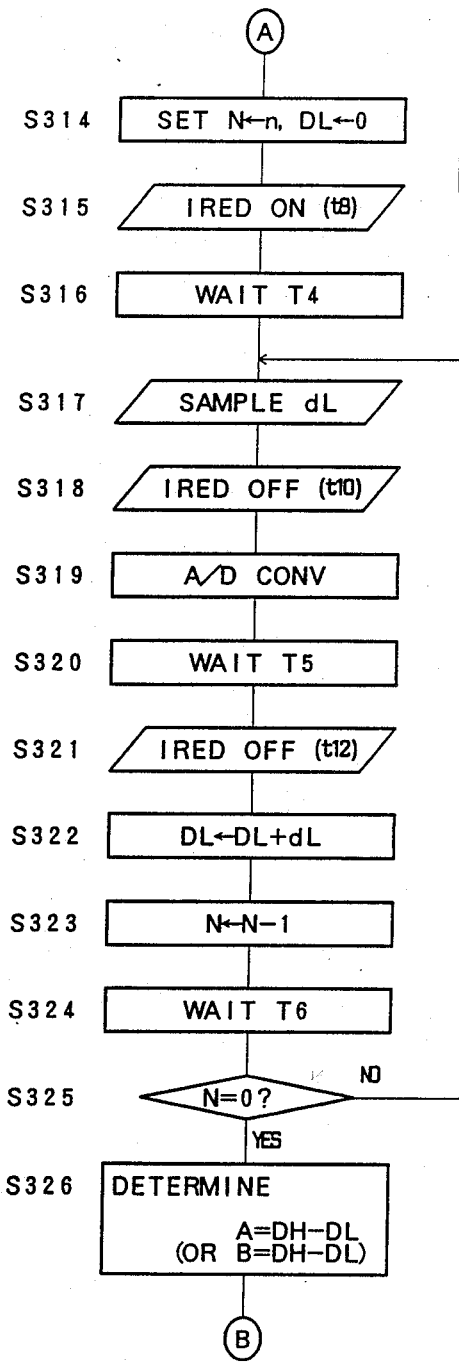

FIG. 3 shows a main routine, in which a step S100 initializes various units, and a step S200 shifts the switch 5 to the side of the signal $S_1$. A step S300 is a gain setting subroutine for setting the gain of the amplifier 7, as will be shown in FIGS. 4A, 4B and 4C.

Initial steps S301 and S302 set the number of data and the initial values. More specifically, the CPU instructs the light projecting circuit 2 to initiate the intermittent drive of the light projector (IRED) 1, whereby the IRED 1 functions intermittently with a predetermined frequency, for example 10 kHz. When the output wave form of the light receiving circuit 4 is stabilized after the initial period of several ten milliseconds, the CPU sets, in an internal register, a value n as the predetermined number N of data, and a value 0 as the initial data $D_H$.

Succeeding steps S303 to S305 execute data sampling while the IRED 1 is turned off. When the IRED 1 is turned off in the on-off cycle thereof (step S303 and time $t_1$ in FIG. 5A), the CPU waits for a period Tl and then samples the high level value $d_H$ of the light signal $S_1$, in a sampling period corresponding to $t_2$-$t_3$ in FIG. 5A.

Subsequent steps S306 to S308 correspond to a turn-on period of the IRED 1. In synchronization with the turning-on of the IRED 1, the CPU executes the A/D conversion of the sampled data $d_H(t_3$-$t_4)$ Then the CPU waits for a period $T_2$ until the IRED 1 is turned off again.

Subsequent steps S309 to S312 correspond to a turn-off period of the IRED 1 in which, during a period $t_5$-$t_6$, the CPU adds the A/D converted value $d_H$ to data $D_H$ (step S310) and subtracts one (1) from the number N of data (step S311). Then the CPU waits for a period $T_3$ ($t_6$-$t_7$) Then a step S313 discriminates whether said number N of data is equal to zero, and the above-explained steps S305 to S312 are repeated until said discrimination turns out affirmative. In this manner obtained is the data $D_H$ by the addition of n data $d_H$. When the discrimination in the step S312 turns out affirmative, indicating the completion of addition of the N A/D-converted values of the high level values $d_H$ of the light signal $S_1$, the sequence proceeds to a step S314 shown in FIG. 4B, for executing the addition of the A/D converted values of the low level values $d_L$.

In said step S314, the CPU sets, in the internal register thereof, a value n as the predetermined number N of data, and a value 0 as the initial data $D_L$.

Subsequent steps S315 to S317 executes data sampling during the turn-on period of the IRED 1. When the IRED 1 is turned on (step S315 and time $t_8$ shown in FIG. 5B), the CPU waits for a period T4 and then samples the low level value $d_L$ of the light signal $S_1$ ($t_{10}$-$t_{11}$).

Then steps S318 to S320 execute A/D conversion of the sampled data $d_L$ during the turn-off period of the IRED 1. Steps S322 to S325 execute data additions n times to obtain data $D_L$.

Then a step S326 determines a value A corresponding to the photocurrent $I_1$, from a value $D_H$-$D_L$.

Figure 4C:
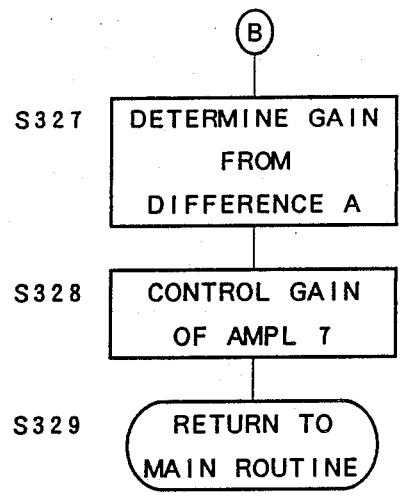
Figure 5A:
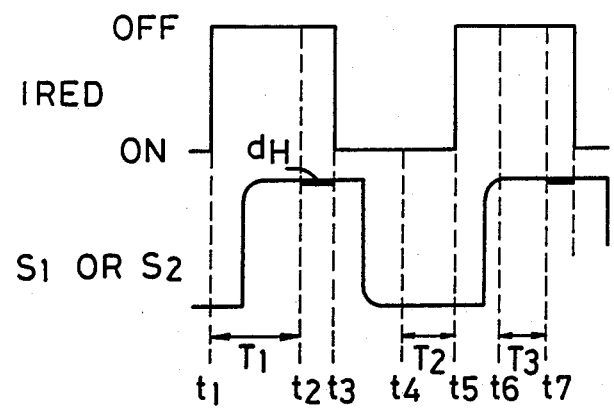
FIGS. 5A, 5B and 6 are time charts respectively indicating data sampling.

Subsequently, as shown in FIG. 4C, a step S327 determines the gain from the calculated value A, and step S328 controls the gain of the amplifier 7. Then a step S329 returns the sequence to the main flow.

After the gain is set in the step S300 shown in FIG. 3, a step S400 again determines the calculated value A of the light signal $S_1$. More specifically, the calculated value A determined in the step S300 is used for determining the gain of the amplifier 7, but the value A determined in the step S400 is used for obtaining the actual distance data.

Figure 4D:
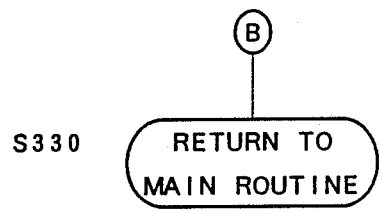

In the step S400, the above-explained steps S301-S326 are executed according to the subroutines shown in FIGS. 4A and 4B, but a step S330 shown in FIG. 4D is executed instead of the routine shown in FIG. 4C whereby the sequence returns to the main routine.

Then a step S500 shifts the switch 5 to the light signal $S_2$ whereby the sequence proceeds to a step S600 for determining with the gain determined in the step S300, a calculated value B by the addition of the differences of the levels $d_H$ and $d_L$ also on the light signal $S_2$, according to the above-explained steps S301-S326 and S330.

Then a step S700 determined the distance data L according to the following equation:

$$L = \frac{A - B}{A + B} \cdot \beta \qquad (2)$$

wherein $\beta$ is a constant.

Finally a step S800 releases said distance data L.

Figure 6:
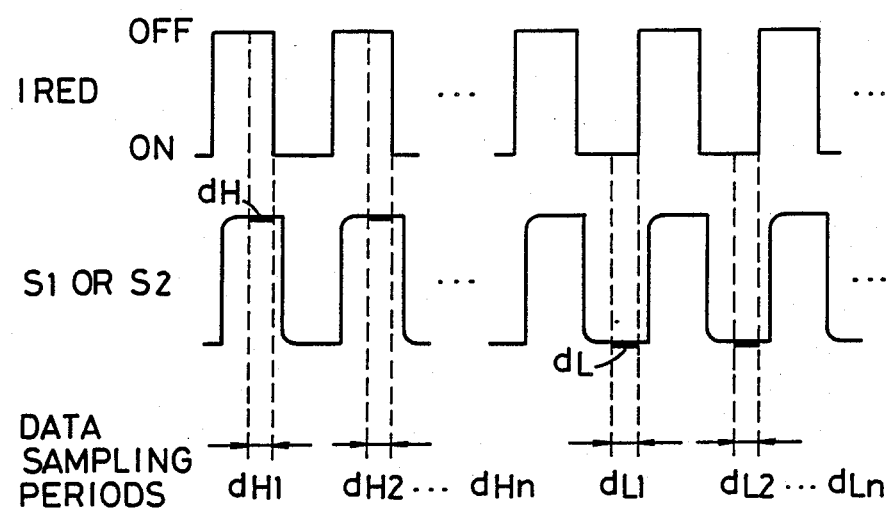

In the above-explained first embodiment, as shown in FIG. 6, alternatively light signals $S_1$ and $S_2$ are released from the light receiving circuit 4 corresponding to the photocurrent $I_1$. Then the added values $D_H$ $$\left( = \sum_{i=1}^{n} d_{Hi} \right) \text{ and } D_L \left( = \sum_{i=1}^{n} d_{Li} \right)$$

are respectively determined from the digitized values of the high level values $d_H$ and the low level values $d_L$ on each of the signals $S_1$ and $S_2$, and the difference $D_H$-$D_L$ is determined as the calculated value A or for said signal $S_1$ or $S_2$. Then the distance data L is determined according to the equation (2). In the distance data L thus determined, the influence of the offset and drift of the amplifier, contained in the light signals is cancelled, so that the precision of the distance measurement is improved.

In the foregoing explanation, there is determined $$\sum_{i=1}^{n} d_{Hi} \text{ and } \sum_{i=1}^{n} d_{Li},$$

but it is also possible to determine the calculated value A or B from the difference of the difference of single values $d_H$ and $D_L$ for obtaining the distance data L.

Figure 7:
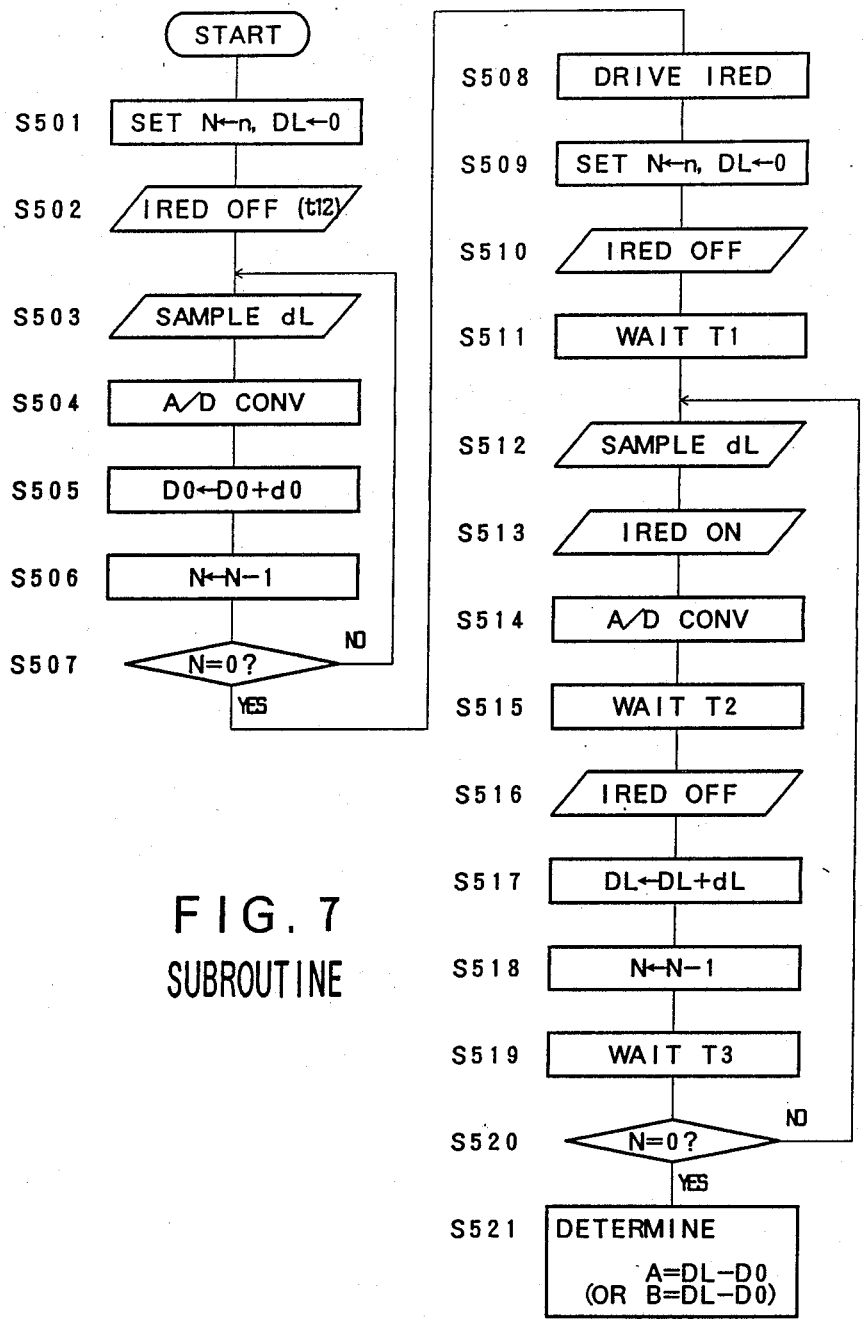
FIG. 7 is a flow chart showing a subroutine for determining the level difference in the alternating signal in a second embodiment.

In another embodiment shown in FIG. 7, the calculated values A, B are determined respectively from the difference between the data $D_H$ and a reference value and that between the data $D_L$ and a reference value, instead of the difference between the data $D_H$ and $D_L$.

A light signal $S_1$ obtained while the IRED 1 is turned off is A/D converted to obtain data $d_0$, and this operation is repeated n times to obtain data $D_0$ $$\left( = \sum_{i=1}^{n} d_{0i} \right)$$

Figure 5B:
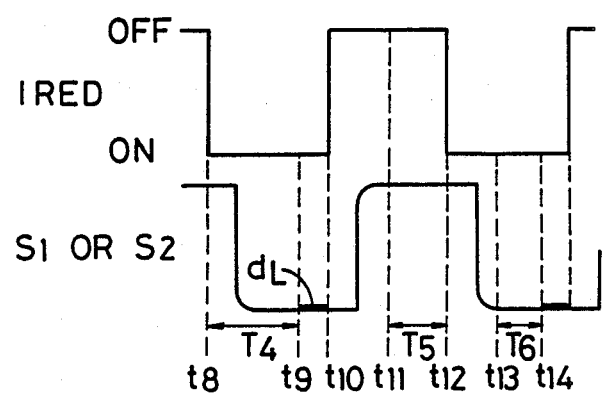

(steps S501–S507). Said data $d_0$ is the reference value of the alternating signal. Then a step S508 turns on the IRED 1 intermittently for several ten milliseconds, and steps S509 to S521 execute, as in the above-explained steps S314–S326, the A/D conversion of a light signal $S_1$ obtained while the IRED 1 is turned off as shown in FIG. 5B to determine data $d_L$, and determine therefrom data $$D_L \left( = \sum_{i=1}^{n} d_{Li} \right).$$

Then a step S526 determines the calculated value A of the light signal $S_1$, from the difference $D_L - D_0$. Also the calculated value B of the light signal $S_2$ is likewise determined, and the distance data L is obtained from the equation (2).

It is also possible, in the steps S509–S521, to determine the calculated values A, B from the light signals $S_1$, $S_2$ obtained during the turn-on period of the IRED 1.

What is claimed is:

1. An active distance measuring apparatus comprising:
    light projecting means for projecting, toward an object a light beam with periodically varying intensity;
    light receiving means for receiving said light beam reflected by said object and generating a pair of alternating signals respectively varying in correspondence with the distance to said object;
    first detection means for detecting a first peak level and a second peak level of one of said paired alternating signals in synchronization with increase and decrease in intensity of said light beam and determining a first level difference corresponding to the difference of thus detected first and second peak levels;
    second detection means for detecting a first peak level and a second peak level of the other of said paired alternating signals in synchronization with increase and decrease in intensity of said light beam and determining a second level difference corresponding to the difference of thus detected first and second peak levels; and
    means for preparing data representing the distance to said object, based on said first and second level differences.

2. An apparatus according to claim 1, further comprising means for supplying a periodical signal, said light projecting means is adapted to project said light beam in response to said periodical signal, and said first and second detection means are adapted to detect said first and second peak levels in response to said periodical signal.

3. An apparatus according to claim 1, further comprising:
    amplifier means for amplifying said alternating signals; and
    means for selecting either a first mode in which said first detection means is connected to said amplifier means for amplification of said one of alternating signals by said amplifier mean,, or a second mode in which said second detection means is connected to said amplifier means for amplification of said the other of alternating signals by said amplifier means.

4. An apparatus according to claim 1, wherein said first detection means is adapted to detect a high level value of said one of alternating signals plural times while said second detection means is adapted to detect a low level value of said the other of alternating signal plural times, and said apparatus further comprising:
    first adder means for adding said plural high level values; and
    second adder means for adding said plural low level values.

5. An apparatus according to claim 1, wherein said light receiving means comprises:
    a photosensor device having a light receiving face; and
    means for introducing the light beam reflected by said object into said light receiving face in such a manner that the incident position on said light receiving face varies according to the change in the distance to said object.

6. An active distance measuring apparatus comprising:
    light projecting means for projecting, toward an object, a light beam with periodically varying intensity;
    light receiving means for receiving said light beam reflected by said object and generating a pair of alternating signals respectively varying in correspondence with the distance to said object;
    means for determining a reference level based on said alternating signals;
    first detection means for detecting a peak level of one of said paired alternating signals in synchronization with the varying period of said light beam and determining a first level difference corresponding to the difference between thus detected peak level and said reference level;
    second detection means for detecting a peak level of the other of said paired alternating signals in synchronization with the varying period of said light beam and determining a second level difference corresponding to the difference between thus detected peak level and said reference level; and
    means for preparing data representing the distance to said object, based on said first and second level differences.

7. An apparatus according to claim 6, further comprising means for supplying a periodical signal, wherein said light projecting means is adapted to project said light beam in response to said periodical signal, and said first and second detection means are adapted to detect said first an second peak levels in response to said periodical signal.

8. An apparatus according to claim 6, further comprising:
    amplifier means for amplifying said alternating signals; and means for selecting either a first mode in which said first detection means is connected to said amplifier means for amplification of said one of alternating signals by said amplifier means, or a second mode in which said second detection means is connected to said amplifier means for amplification of said the other of alternating signals by said amplifier means.

9. An apparatus according to claim 6, wherein said first detection means comprises means for detecting said peak level of said one of alternating signals plural times and adding thus detected plural peak levels, and said second detection means comprises means for detecting said peak value of said the other of alternating signals plural times and adding thus detected plural peak levels.

* * * * *